US011933993B2

United States Patent
Shimano

(10) Patent No.: US 11,933,993 B2
(45) Date of Patent: Mar. 19, 2024

(54) IMAGING OPTICAL SYSTEM, IMAGING APPARATUS AND FOCAL-DEPTH EXTENSION OPTICAL SYSTEM

(71) Applicant: Hitachi, Ltd., Tokyo (JP)

(72) Inventor: Takeshi Shimano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 17/451,450

(22) Filed: Oct. 19, 2021

(65) Prior Publication Data

US 2022/0128739 A1    Apr. 28, 2022

(30) Foreign Application Priority Data

Oct. 28, 2020 (JP) .................................. 2020-180063

(51) Int. Cl.
G02B 3/00 (2006.01)
H04N 23/80 (2023.01)

(52) U.S. Cl.
CPC .............. G02B 3/0056 (2013.01); G06T 5/73 (2024.01); H04N 23/80 (2023.01)

(58) Field of Classification Search
CPC ......... G02B 3/0056; H04N 23/80; G06T 5/73
USPC ...................................................... 359/742
See application file for complete search history.

(56) References Cited

U.S. PATENT DOCUMENTS

| 7,660,225 B2 | 2/2010 | Kimura et al. |
| 7,957,249 B2 | 6/2011 | Kimura et al. |
| 10,571,710 B2 | 2/2020 | Oota et al. |
| 2010/0322059 A1* | 12/2010 | Yasui ................ G02B 27/4238 |
| 2016/0057337 A1 | 2/2016 | Shimano et al. |
| 2018/0173005 A1 | 6/2018 | Oota et al. |

FOREIGN PATENT DOCUMENTS

| CN | 101191842 A | 6/2008 |
| CN | 101789243 A | 7/2010 |
| CN | 108227062 A | 6/2018 |
| JP | 2015-4883 A | 1/2015 |
| JP | 2015-102767 A | 6/2015 |
| JP | 2018-101065 A | 6/2018 |
| WO | WO 2012/132685 A1 | 10/2012 |
| WO | WO 2013/122175 A1 | 8/2013 |
| WO | WO 2015/155842 A1 | 10/2015 |

OTHER PUBLICATIONS

Chinese-language Office Action issued in Chinese Application No. 202111180392.0 dated Apr. 14, 2023 (six (6) pages).

* cited by examiner

*Primary Examiner* — Wyatt A Stoffa
*Assistant Examiner* — Mitchell T Oestreich
(74) *Attorney, Agent, or Firm* — Crowell & Moring LLP

(57) ABSTRACT

An imaging optical system includes an optical component having a plurality of annular grooves formed to provide a phase to optical ray propagating an effective pupil, the phase causing the longitudinal aberration of the optical ray to alternate plural times to zigzag, and therefore, a focal-depth extended image being clear and having a large focal depth in a uniform image quality is achieved in a wide defocus range in front and back of a focal point.

7 Claims, 5 Drawing Sheets

IMAGING OPTICAL SYSTEM, IMAGING APPARATUS AND FOCAL-DEPTH EXTENSION OPTICAL SYSTEM

CROSS-REFERENCE TO RELATED APPLICATION

The present application claims priority from Japanese Patent Application No. 2020-180063 filed on Oct. 28, 2020, the content of which is hereby incorporated by reference into this application.

TECHNICAL FIELD OF THE INVENTION

The present invention relates to an imaging optical system, an imaging apparatus and a focal-depth extension system.

BACKGROUND OF THE INVENTION

A Japanese Patent Application Laid-Open Publication No. 2018-101065 (Patent Document 1) discloses a technique of extending a focal depth of a captured image by arranging an annular phase plate at an aperture stop position of an imaging optical system to perform an imaging process to the captured image. Specifically, the Patent Document 1 describes that, in each annular pattern, an area of an inner-circumferential region of normalized radius coordinates having the maximum annular pattern height value and an area of an outer-circumferential region of the same are made equal to each other, and a slope of a tangent line of an inner-circumferential end of the annular pattern and a slope of a tangent line of an outer-circumferential end of the annular pattern are made equal to each other. The Patent Document 1 describes that this technique makes a defocus range that provides an allowable-ranged imaging property to be equal between both sides of a focal point.

A Japanese Patent Application Laid-Open Publication No. 2015-4883 (Patent Document 2) discloses a technique of extending a focal depth of a captured image by performing an imaging process to the captured image in an optical system having spherical aberration.

RELATED ART DOCUMENTS

Patent Documents

Patent Document 1: Japanese Patent Application Laid-Open Publication No. 2018-101065
Patent Document 2: Japanese Patent Application Laid-Open Publication No. 2015-4883

SUMMARY OF THE INVENTION

However, in the Patent Document 1, the slope of the tangent line discontinuously changes at a boundary between the annular patterns, and therefore, an edge of a ridge line is sharpened. Thus, image capturing under circumstances with a bright optical source generates scattered stray light noises such as flare. Also, even when the defocus range providing the allowable image-formation property can be made equal between the both sides of the focal point, an evaluation indicator value (such as a PSNR: Peak Signal to Noise Ratio (SN ratio)) for the image-formation property is asymmetric between positions in front and back of the focal point in some cases.

In the Patent Document 2, a focal depth is extended by a restoring process to an image having a blur point spread on a focal plane due to spherical aberration. However, by such a method, the focal depth cannot be sufficiently extended.

Accordingly, a purpose of the present invention is to achieve a focal-depth extended image being clear and having a large focal depth in a uniform image quality in a wide defocus range in front and back of a focal point.

The summary of the typical aspects of the inventions disclosed in the present application will be briefly described as follows.

An imaging optical system according to a typical embodiment of the present invention includes an optical component having a plurality of annular grooves formed to provide a predetermined phase to optical ray propagating an effective pupil. The plurality of annular grooves are sequentially formed from an inner circumferential side to an outer circumferential side. In each of the annular grooves, a value of longitudinal aberration of the optical ray between an inner circumferential end of the annular grooves and an outer circumferential end of the annular grooves continuously changes between a first value and a second value, a sign of which is inverted from that of the first value. The value of the longitudinal aberration between the plurality of annular grooves alternates between the first value and the second value plural times to zigzag. The longitudinal aberration continues at a boundary between the annular grooves that are adjacent to each other. In each of the annular grooves, an area of an inner circumferential plane of the optical component and an area of an outer circumferential plane of the optical component are almost equal to each other at a zero cross point at which the longitudinal aberration is zero.

The effects obtained by the typical aspects of the present invention disclosed in the present application will be briefly described below.

In other words, the typical embodiment of the present invention can improve a focal-depth extended image being clear and having a large focal depth in a uniform image quality in a wide defocus range in front and back of a focal point.

BRIEF DESCRIPTIONS OF THE DRAWINGS

DESCRIPTIONS OF THE PREFERRED EMBODIMENTS

First Embodiment

Hereinafter, embodiments of the present invention will be described with reference to the accompanying drawings. Each embodiment described below is only one example for achieving the present invention, and does not limit the technical scope of the present invention. In examples, note that components having the same function are denoted by the same reference symbols, and the repetitive description thereof will be omitted unless otherwise particularly required.

Figure 1:
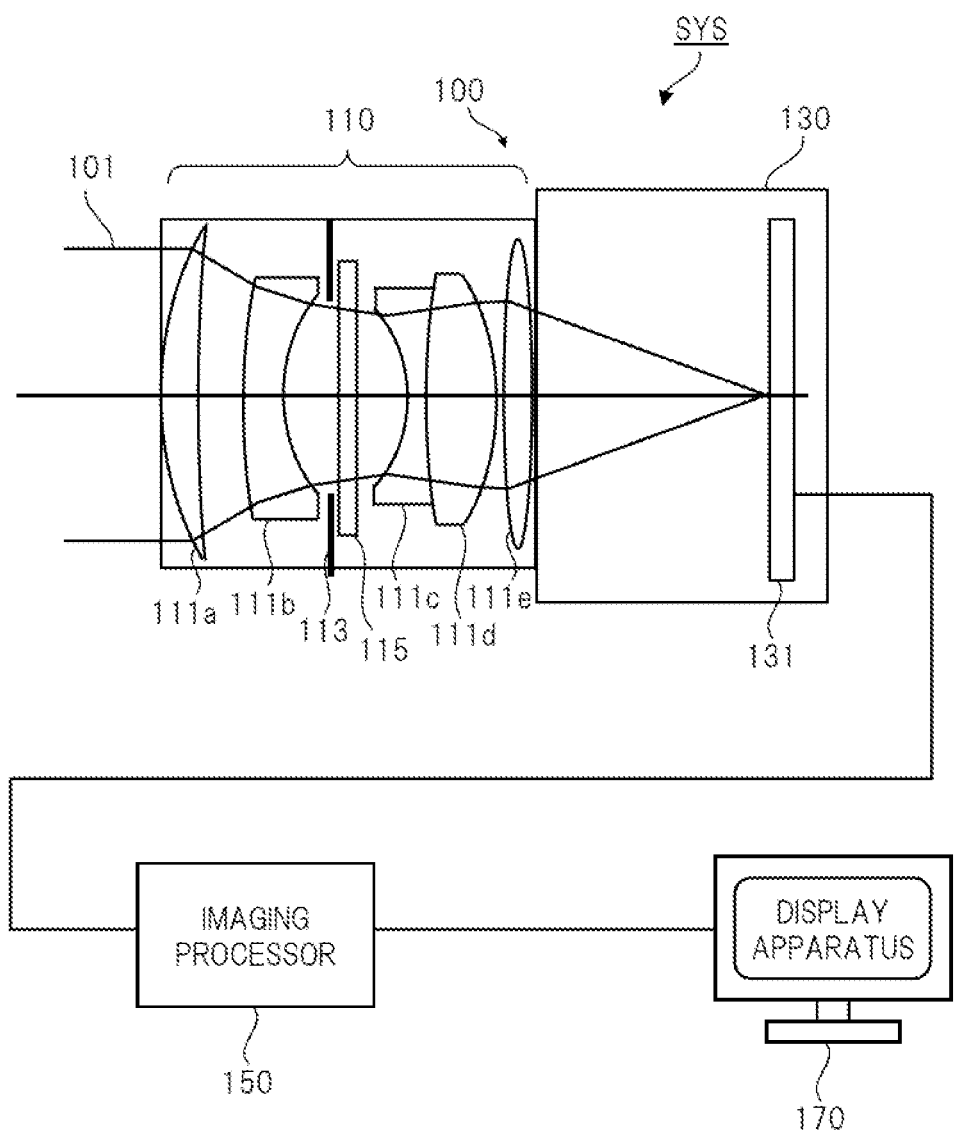
FIG. 1 is a configurational diagram showing one example of a focal-depth extension optical system including an imaging apparatus according to a first embodiment of the present invention.

FIG. 1 is a configurational diagram showing one example of a focal-depth extension optical system including an imaging apparatus according to a first embodiment of the present invention. The focal-depth extension optical system SYS of FIG. 1 is a system that is called, for example, Wavefront Coding (WFC).

As shown in FIG. 1, the focal-depth extension optical system SYS includes an imaging apparatus 100 and an imaging processor 150. In FIG. 1, note that the configuration of the focal-depth extension optical system SYS includes a display apparatus 170. However, a configuration not including the display apparatus 170 may be applicable.

The imaging apparatus 100 includes an imaging optical system 110 and a housing 130 that houses an imaging sensor 131. The imaging optical system 110 includes single or a plurality of optical lenses. In the example of FIG. 1, a plurality of optical lenses 11a to 111e are arranged in an order from an optical incident side to an optical output side (close to the housing). Between the optical lens 111b and the optical lens 111c, an aperture stop 113 and a phase plate (optical component) 115 are arranged in the order from the optical incident side to the optical output side. In this manner, the phase plate 115 is arranged to be close to the aperture stop. The imaging optical system 110 will be explained in detail later.

The housing 130 is connected to the imaging processor 150. A method for connection between the housing 130 and the imaging processor 150 may be a wired connection or a wireless connection. The housing 130 and the imaging processor 150 are connected to each other through a network.

Each pixel of the imaging sensor 131 produces a pixel data in accordance with the incident light. Pieces of the image data of the respective pixels are collected into one image data to produce the captured image. The captured image is output to the imaging processor 150, and is subjected to an imaging process for blur removal in the imaging processor 150. The captured image done with the imaging process is displayed on the display apparatus 170. And, the captured image done with the imaging process is stored in a storage apparatus not illustrated.

As shown in FIG. 1, an image based on light 101 from an object is formed on the imaging sensor 131 by the imaging optical system 110. At this stage, by the phase plate 115, predetermined aberration is applied to the optical ray collected to the imaging sensor 131. This aberration generates blur by which the optically-collected point spread is not varied depending on the defocus of the imaging sensor or the object. In this manner, the imaging apparatus 100 produces the blurred captured image having the little variation in the point spread on the defocus.

The imaging processor 150 performs an imaging process for removal of the blur or others to the captured image produced by the imaging apparatus 100, and displays the captured image done with the imaging process onto the display apparatus 170 or others. The resultant captured image done with the imaging process is an image having the defocus but the large focal depth without the blur.

<Imaging Optical System>

Figure 2:
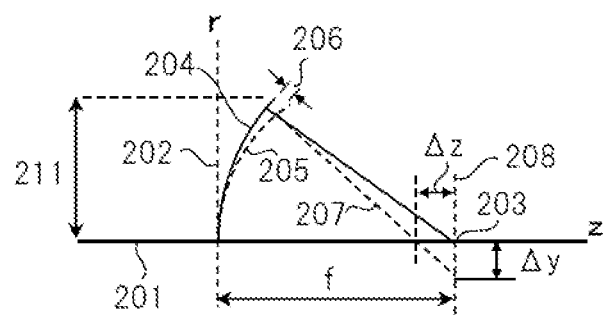
FIG. 2 is a diagram for explaining a relation between wavefront aberration and ray aberration.

The imaging optical system will be explained in detail here. First, a relation between wavefront aberration and ray aberration in the phase plate will be explained. FIG. 2 is a diagram for explaining the relation between the wavefront aberration and the ray aberration. In FIG. 2, a horizontal axis "z" represents an optical axis 201, and a vertical axis "r" represents an exit pupil 202.

The exit pupil 202 is an image of an aperture produced by an optical lens (rear-lens optical system) arranged to be closer to the imaging sensor than the aperture, and is a virtual aperture plane on the exit side that allows a lens optical system in a combination of a plurality of optical lenses to be regarded as a virtual thin lens.

A wave front of the light output from the exist pupil 202 and collected onto the focal point 203 to be without the aberration is a reference wave front 204. An optical path difference between the reference wave front 204 and an aberration wave front 205 practically having the aberration in an optical-ray direction is wavefront aberration 206. The wavefront aberration 206 is expressed by a function of a radius "r" crossing the exit pupil 202.

Meanwhile, a height of a point at which the optical ray with the aberration 207 crosses a focal point plane 208 from an optical axis 201, in other words, a distance between the focal point plane 208 and a point at which the optical ray 208 crosses the optical axis 201 is lateral aberration $\Delta y$. A distance between the focal point plane 208 and a point at which the optical ray 208 crosses the optical axis 201 is longitudinal aberration $\Delta z$.

The wavefront aberration 206 is expressed by a function $W(r)$ of a radius r of an exit pupil plane, and is approximated in an assumption that an effective radius (effective pupil) 211 of the exit pupil 202 is smaller than a focal distance f (the approximation is so-called paraxial approximation). Since the optical ray travels in vertical to the wave front, the lateral aberration $\Delta y$ is expressed by the following equation (1).

$$\Delta y = f \cdot (dW/dr) \qquad (1)$$

Meanwhile, the longitudinal aberration $\Delta z$ is expressed by the following equation (2).

$$\Delta z = \Delta y/(r/f) = (f^2/r)(dW/dr) = (1/(NA^2 \rho))(dW/d\rho) \qquad (2)$$

In the equation, a term "$\rho$" is a radius obtained by normalization of the radius r of the exit pupil plane by the effective radius R, and is expressed by the following equation (3). A term "NA" is a numerical aperture expressed by the following equation (4).

$$\rho = r/R \qquad (3)$$

$$NA = R/f \qquad (4)$$

If the longitudinal aberration $\Delta z$ is generated by the phase plate, the longitudinal aberration $\Delta z$ is equivalent to an amount of the defocus between the optical ray penetrating the optical axis 201 and the optical ray penetrating a predetermined pupil radius position. Therefore, the wavefront aberration 206 of the phase plate is designed so that this longitudinal aberration Δz is uniformly distributed in a predetermined focal-depth extension range.

Figure 3:
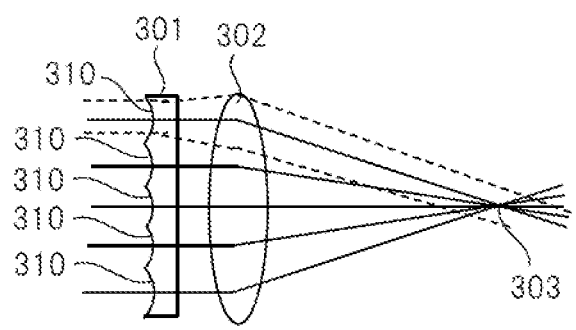
FIG. 3 is a diagram for explaining a focal-depth extension optical system.

FIG. 3 is a diagram for explaining the focal-depth extension optical system. In a phase plate 301 of FIG. 3, a plurality of annular grooves 310 having a parabolic cross-sectional shape axisymmetric across the optical axis are formed. In each annular groove 310, optical ray penetrating a bottom of the annular groove 310 having a normal line in parallel to the optical axis penetrates an original focal point 303 of the optical lens 302 not to generate the aberration.

On the other hand, a plane of the annular groove at other portions than the bottom of the annular groove 310, in other words, at portions at which the normal line slopes with respect to the optical axis, acts as a concave lens. Therefore, the penetrating optical ray at the portions at which the normal line slopes with respect to the optical axis travels to shift to positions in front and back of the focal point 303 as shown with a broken line of FIG. 3, and therefore, the point image is blurred.

In each annular groove 310, in order to uniform the point image intensities in the focal-depth extension range at the positions in front and back of the focal point 303 as much as possible, an area of a plane in an outer region (close to the outer circumference) of the circular grove 310 and an area of a plane in an inner region (close to the inner circumference) of the circular grove 310 to be equally split at the bottom of the annular groove 310 are almost equal to each other. In other words, in an assumption that a normalized radius of the bottom of the annular groove 310 with respect to the optical axis is "$\rho_0$", a normalized radius of an inner circumferential end of the annular groove 310 is "$\rho_1$", and a normalized radius of an outer circumferential end of the annular groove 310 is "$\rho_2$", the following equations (5) and (6) are provided.

$$\rho_2^2 - \rho_0^2 = \rho_0^2 - \rho_1^2 \qquad (5)$$

$$\rho_0^2 = (\rho_1^2 + \rho_2^2)/2 \qquad (6)$$

Figure 4:
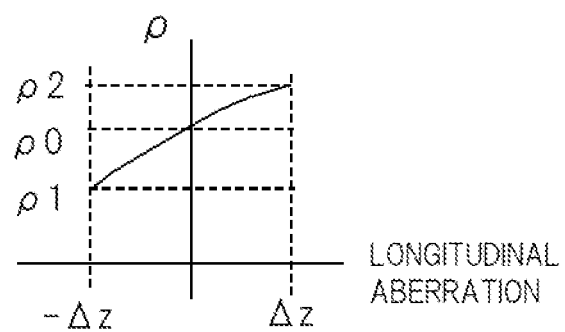
FIG. 4 is a diagram schematically exemplifying longitudinal aberration in single annular groove.
Figure 5:
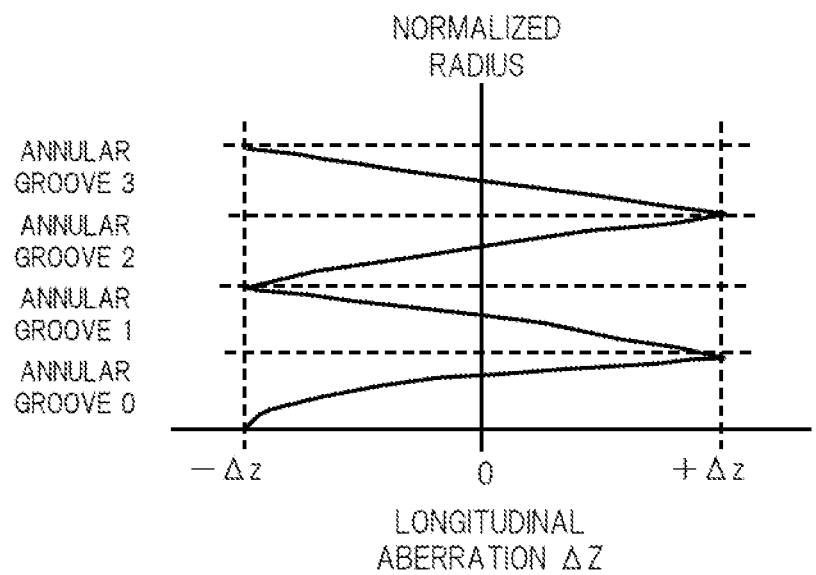
FIG. 5 is a diagram schematically exemplifying longitudinal aberration in a plurality of annular grooves.

FIG. 4 is a diagram schematically exemplifying the longitudinal aberration in single annular groove. FIG. 5 is a diagram schematically exemplifying the longitudinal aberration in a plurality of annular grooves. For example, as shown in FIG. 4, in one annular groove 310, values of the longitudinal aberration of the optical ray penetrating the inner circumferential end of the annular groove 310 and the longitudinal aberration of the optical ray penetrating the outer circumferential end of the annular groove 310 are the same absolute value but have signs that are inverted to each other. Specifically, in each annular groove, a value of the longitudinal aberration of the optical ray between the inner circumferential end of the annular groove and the outer circumferential end of the annular groove is configured to continuously change in a range from the first value to the second value having the inverted sign of the first value. In this manner, the optical ray between the inner circumferential end and the outer circumferential end of this annular groove 310 uniformly distributes within the focal-depth extension range, and the uniform point spread is provided. In other words, the absolute value of the first value and the absolute value of the second value are the same as each other.

However, since the bottom of the annular groove 310 at which the longitudinal aberration Δz is "0" is not the middle point between the inner circumferential end and the outer circumferential end of the annular groove as shown in the equation (6), the function of the longitudinal aberration in FIG. 4 cannot be expressed by at least a linear function in terms of the normalized radius ρ. Accordingly, it is assumed that this longitudinal aberration can be expressed by a quadratic function shown in the following equation (7).

$$\Delta z(\varphi) = a\rho^2 + b\rho + c \qquad (7)$$

Since this quadratic function satisfies the relation shown in FIG. 4, the following system of equations (8) to (10) are provided.

$$-\Delta z = a\rho_1^2 + b\rho_1 + c \qquad (8)$$

$$0 = a\rho_0^2 + b\rho_0 + c \qquad (9)$$

$$+\Delta z = a\rho_2^2 + b\rho_2 + c \qquad (10)$$

By solution for the equations (8) to (10), the following equations (11) to (13) are provided.

$$a = \Delta z/(\rho_0^2 - \rho_1^2) \qquad (11)$$

$$b = 0 \qquad (12)$$

$$c = -(\Delta z \cdot \rho_0^2)/(\rho_0^2 - \rho_1^2) \qquad (13)$$

Meanwhile, in accordance with the equation (2), the wavefront aberration W(r) satisfying such longitudinal aberration satisfies a relation of the following equation (14).

$$dW/d\rho = (\Delta z/(\rho_0^2 - \rho_1^2))NA^2(\rho^3 - \rho_0^2\rho) \qquad (14)$$

When the equation (14) is integrated under a condition of "$W(\rho_1) = 0$", the wavefront aberration W(r) is expressed by a quartic function shown in the following equation (15).

$$W(\varphi) = (\Delta z \cdot NA^2/(4(\rho_0^2 - \rho_1^2))) \times (\rho^4 - 2\rho_0^2\rho^2 - \rho_1^4 + 2\rho_1^2\rho_0^2) \qquad (15)$$

When the wavefront aberration expressed by the equation (15) is achieved by a parallel-plate transparent optical element, a relation of the following equation (16) is satisfied under conditions in which a sag amount is Z(ρ) while a refractive index of an optical material at a wave length "A" is "n". Therefore, the sag amount Z(ρ) is expressed by the following equation (17).

$$W(\rho) = Z(\rho) \times (n-1) \qquad (16)$$

$$Z(\rho) = (1/(n-1))W(\rho) \qquad (17)$$

The contents explained here support the single annular groove. The wavefront aberration is also designed for another annular grooves so that the longitudinal aberration satisfies the relation of FIG. 5. In the case of the formation of the plurality of annular grooves, the sign of the value of the longitudinal aberration is designed to be alternately inverted between the adjacent annular grooves as shown in FIG. 5. In other words, in the case of the formation of the plurality of annular grooves, the longitudinal aberration Δz is designed to continue at a boundary between the adjacent annular grooves. In this manner, in the entire phase plate 115, each annular groove is formed so that the longitudinal aberration zigzags from the optical axis toward the outer circumferential end.

The longitudinal aberration Δz is expressed by differential of the wavefront aberration as shown in the equation (2). Therefore, even when the longitudinal aberration Δz zigzags as shown in FIG. 5, if the longitudinal aberration Δz continues at the boundary between the adjacent annular grooves, the wavefront aberration resulted from the integral of the longitudinal aberration becomes a smoothly-continued plane. Therefore, the incident light on the phase plate 115 is uniformly bent and does not scatter at the boundary between the annular grooves, and the stray light or others is difficult to be generated.

Figure 6:
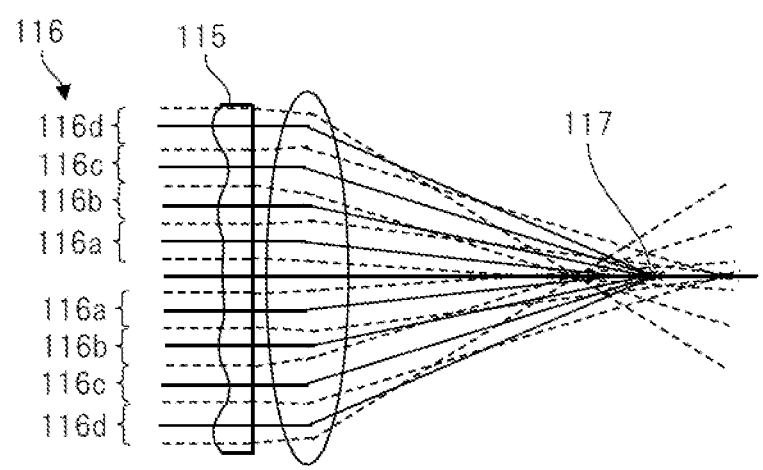
FIG. 6 is a diagram showing one example of a configuration of an imaging optical system including a phase plate according to the first embodiment of the present invention.

FIG. 6 is a diagram showing one example of a configuration of an imaging optical system including the phase plate according to the first embodiment of the present invention. As shown in FIG. 6, the plurality of annular grooves 116 are formed in the phase plate 115 to line from the optical axis toward the outer circumference. FIG. 6 shows an example of formation of four annular grooves 116a to 116d. However, the number of the annular grooves 116 is not particularly limited.

As shown in FIG. 6, the phase plate 115 has a convex-concave shape having a plurality of convex portions and concave portions that are smoothly connected in optical-axis symmetric to each other in a radius direction. The convex portions and the concave portions correspond to the annular grooves 116, respectively. In this manner, the phase plate 115 of FIG. 6 includes the plurality of annular grooves 116 made of the convex portions and the concave portions. The optical ray shown with a solid line penetrates a trough or a peak of each annular groove 116, and therefore, is collected on a focal point 117 not to have aberration. On the other hand, the optical ray penetrating a peripheral region of the trough or the peak of each annular groove 116 shown with a broken line is refracted by the slope of the plane of the annular groove 116, and is focused to shift to the position in front or back of the focal point 117. Note that the trough of each annular groove 116 is a point at which a plane of the concave portion has an extremum, and the peak of each annular groove 116 is a point at which a plane of the convex portion has an extremum.

At the boundary between the concave portion and the convex portion, a second-order differential value of the sag amount expressed by the equation (17) is almost discontinuous. A width of each annular groove 116 is not particularly limited. However, as a result of simulation making difference in the width of the annular groove 116 of the phase plate 115 according to the present embodiment, it is found that the focal-depth extension performance is higher in a case in which the widths of the annular grooves 116 on the inner circumferential end and the outer circumferential end are equal to each other than a case in which the width of the annular groove 116 on the outer circumferential end of the phase plate 115 is narrower than the width of the annular groove 116 on the inner circumferential end.

<Main Effect According to Present Embodiment>

According to the present embodiment, the value of the longitudinal aberration $\Delta z$ between the plurality of annular grooves 116 zigzags plural times between the first value and the second value. The longitudinal aberration $\Delta z$ continues at the boundary between the adjacent annular grooves 116. In each of the annular grooves 116, an area of an inner circumferential plane of the phase plate (optical component) 115 and an area of an outer circumferential plane of the phase plate 115 are almost equal to each other at a zero cross point at which the longitudinal aberration $\Delta z$ is zero.

This configuration equalizes a light quantity of a region where the longitudinal aberration $\Delta z$ is on a positive side and a light quantity of a region where the longitudinal aberration $\Delta z$ is on a negative side at the zero cross point. And, the optical ray in the positive and negative regions of the defocus uniformly distributes within the focal-depth extension range, and the uniform point spread is provided. Then, the imaging process for the removal of the blur is performed to the captured image produced from such an imaging optical system. This manner can achieve a focal-depth extended image being clear and having a large focal depth in a uniform image quality in a wide defocus range in front and back of the focal point.

According to the present embodiment, a change range of the longitudinal aberration $\Delta z$ in each annular groove 116 is almost equal among the plurality of annular grooves 116. According to this configuration, the light quantity of the region where the longitudinal aberration $\Delta z$ is on the positive side and the light quantity of the region where the longitudinal aberration $\Delta z$ is on the negative side in each annular groove are equal among the plurality of annular grooves 116.

According to the present embodiment, at the boundary between the concave portion and the convex portion, the second-order differential value of the sag amount is almost discontinuous. This configuration continuously connects the concave portion and the convex portion, and can suppress the generation of the scattered light.

According to the present embodiment, in the concave portion, the area of the inner circumferential plane of the phase plate 115 and the area of the outer circumferential plane of the phase plate 115 are almost equal to each other at the point at which the plane of the concave portion has the extremum. In the convex portion, the area of the inner circumferential plane of the phase plate 115 and the area of the outer circumferential plane of the phase plate 115 are almost equal to each other at the point at which the plane of the convex portion has the extremum.

This configuration equalizes the light quantity of the region where the longitudinal aberration $\Delta z$ is on the positive side and the light quantity of the region where the longitudinal aberration $\Delta z$ is on eth negative side at the zero cross point. And, the optical ray in the positive and negative regions of the defocus uniformly distributes within the focal-depth extension range, and the uniform point spread is provided. Then, the imaging process for the removal of the blur is performed to the captured image produced by such an imaging optical system. This manner can achieve a focal-depth extended image being clear and having a large focal depth in a uniform image quality in a wide defocus range in front and back of the focal point.

According to the present embodiment, the widths of the plurality of annular grooves 116 are almost equal to one another. This configuration can more improve the evaluation indicator value of the captured image done with the imaging process for the defocus than that in a case of making difference in the width for each annular groove 116. In other words, the present embodiment can improve the image quality of the captured image done with the imaging process.

According to the present embodiment, a sag shape of the concave portion along the radius direction of the phase plate 115 is expressed by a quartic or high-order function. This configuration can more improve the optical property since the shapes of the concave and the convex portions can be designed in detail.

First Example

Next, a first example according to the present embodiment will be explained. Each condition of the first example is as follows. An "F" value of the imaging optical system 110 is 2.19, a focal distance of the imaging optical system 110 is 45 mm, a pixel pitch of the imaging sensor 131 is 3.27 μm, the number of pixels of the imaging sensor 131 is 1024×1024, a distance from the imaging apparatus 100 to an image-capturing target object is 18.7 m, the number of annular grooves 116 is three, and the widths of the respective annular grooves 116 are equal to one another.

Figure 7:
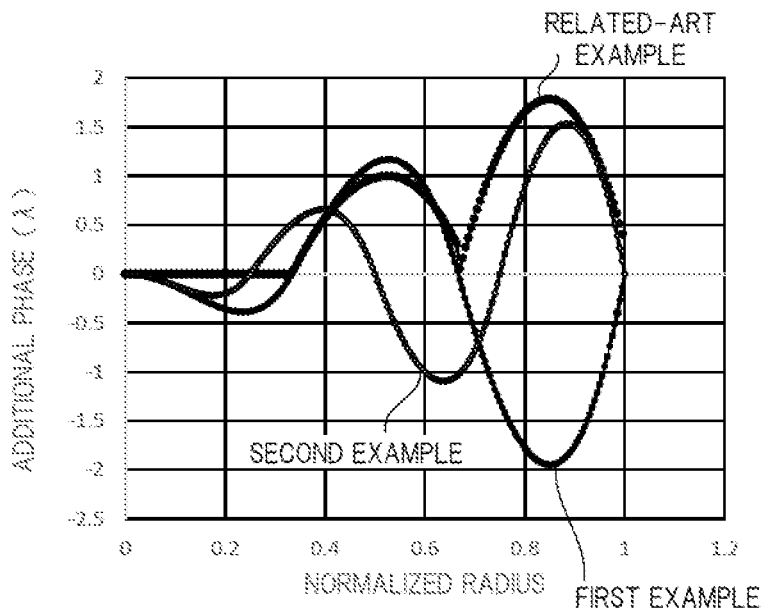
FIG. 7 is a diagram exemplifying an additional phase applied to light in a phase plate.

FIG. 7 is a diagram exemplifying an additional phase added to the light in the phase plate. FIG. 7 shows the first example, a later-described second example and a related-art example to overlap one another. The related-art example is an example using the configuration of the Patent Document 1. In FIG. 7, a horizontal axis represents a normalized radius at a position at which the optical ray crosses the pupil plane, and a vertical axis represents the additional phase (phase), a unit of which is an optical wavelength A.

As shown in the equation (15), the function of the wavefront aberration is set for each annular groove 116. However, in the phase plate 115 of the present embodiment, the phase distribution is smoothly connected at the boundary between the adjacent annular grooves 116 as shown in FIG. 7. The term "smooth" described here means that a first-order differential of a curve representing the phase property continues at the boundary between the adjacent annular grooves 116.

An optical plane shape of the phase plate 115 providing such a property is a shape in proportional to the curve representing the phase property. Therefore, the phase plate 115 has no-step shape at the boundary between the adjacent annular grooves 116 (see, for example, FIG. 6). This configuration has a merit that does not generate the scattered light noises or others at the boundary between the adjacent annular grooves 116.

On the other hand, as the related-art example, FIG. 7 shows the additional phase distribution of the phase plate designed under the same conditions as those of the present example. However, in the comparison example, as shown in, for example, FIG. 3, the boundary between the adjacent annular grooves 310 does not have the smooth shape. Therefore, in the related-art example, as shown in FIG. 7, the phase distribution at the boundary between the adjacent annular grooves is not smoothly connected. In other words, the first-order differential of the curve representing the phase property is discontinuous, and there is the step.

Figure 8:
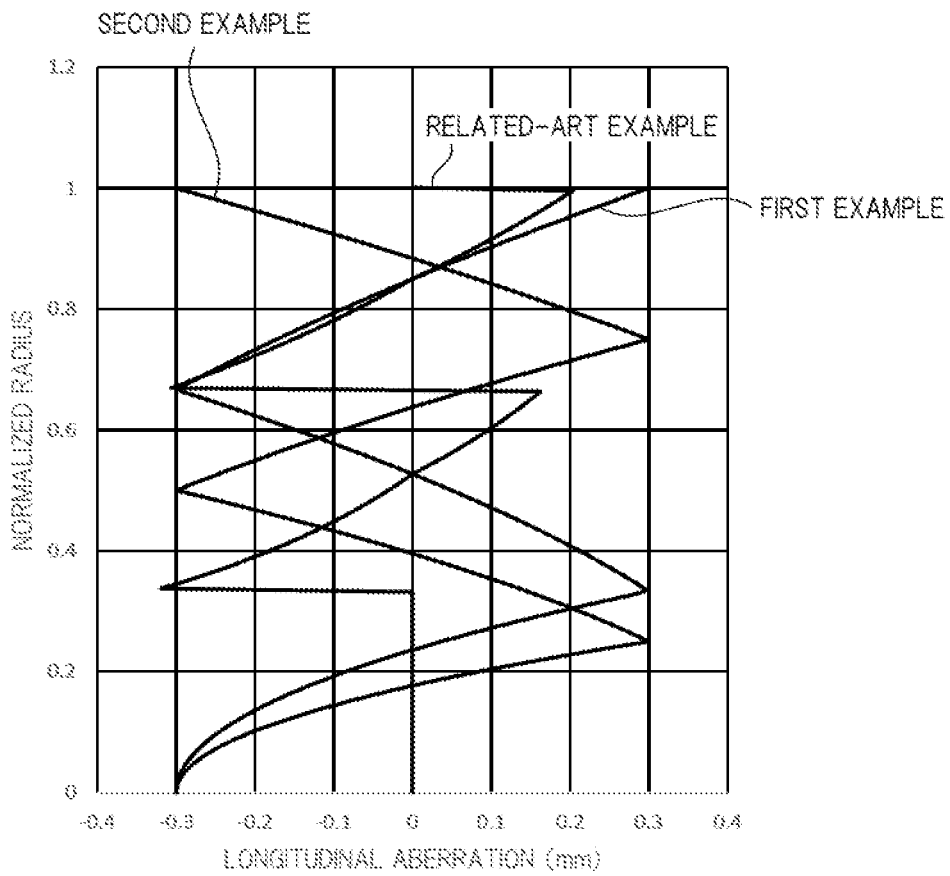
FIG. 8 is a diagram exemplifying longitudinal aberration of the phase plate.

FIG. 8 is a diagram exemplifying the longitudinal aberration of the phase plate. FIG. 8 shows the first example, the later-described second example and the related-art example to overlap one another. In the present example, the values of the longitudinal aberrations $\Delta z$ of the respective annular grooves 116 are set to be +0.3 mm, −0.3 mm and +0.3 mm in an order outward from the inside. In FIG. 8, a horizontal axis represents the longitudinal aberration, and a vertical axis represents the normalized radius at which the optical ray crosses the pupil plane.

As shown in FIG. 8, in the first example, it is found that the set longitudinal aberration $\Delta z$ is reflected to provide a property in which the value of the longitudinal aberration $\Delta z$ alternates between ±0.3 mm in each annular groove 116. In other words, the property is designed so that the value of the longitudinal aberration $\Delta z$ alternates between ±0.3 mm to draw an "L" shape in each annular groove 116. In still other words, the property is designed so that the values of the longitudinal aberrations $\Delta z$ alternates between ±0.3 mm to zigzag in the plurality of annular grooves 116.

The zero cross point at which the longitudinal aberration $\Delta z$ is zero and crosses the vertical axis is at a position equally splitting the inner region and the outer region of each annular groove 116 to have the same area. In other words, in each annular groove 116, the area of the inner circumferential plane of the phase plate 115 and the area of the outer circumferential plane of the phase plate 115 are almost equal to each other at the zero cross point at which the longitudinal aberration $\Delta z$ is zero.

Therefore, at the zero cross point, the light quantity of the region where the longitudinal aberration $\Delta z$ is on the positive side and the light quantity of the region where the longitudinal aberration $\Delta z$ is on the negative side are equal to each other.

This configuration improves the symmetric property of the longitudinal aberration $\Delta z$ between the positive side and the negative side of the zero cross point, and improves the symmetric property of the image quality change with respect to the defocus.

On the other hand, in the related-art example, the longitudinal aberration at the boundary between the annular grooves is discontinuous as shown in FIG. 8. Besides, in the related-art example, while the longitudinal aberration on the negative side of the zero cross point is −0.3 mm, the longitudinal aberration on the positive side of the zero cross point is smaller than 0.3 mm. In this manner, in the related-art example, it is found that the change of the longitudinal aberration is not symmetric across the zero cross point.

The zero cross point at which the longitudinal aberration crosses the vertical axis is the radius position equally splitting the annular groove, which is almost the same position as that of the first example, and has the symmetric property of the light quantity based on the defocus but has the worse symmetric property of the image quality change based on the defocus than that of the first example because of not having the symmetric property of the longitudinal aberration.

Figure 9:
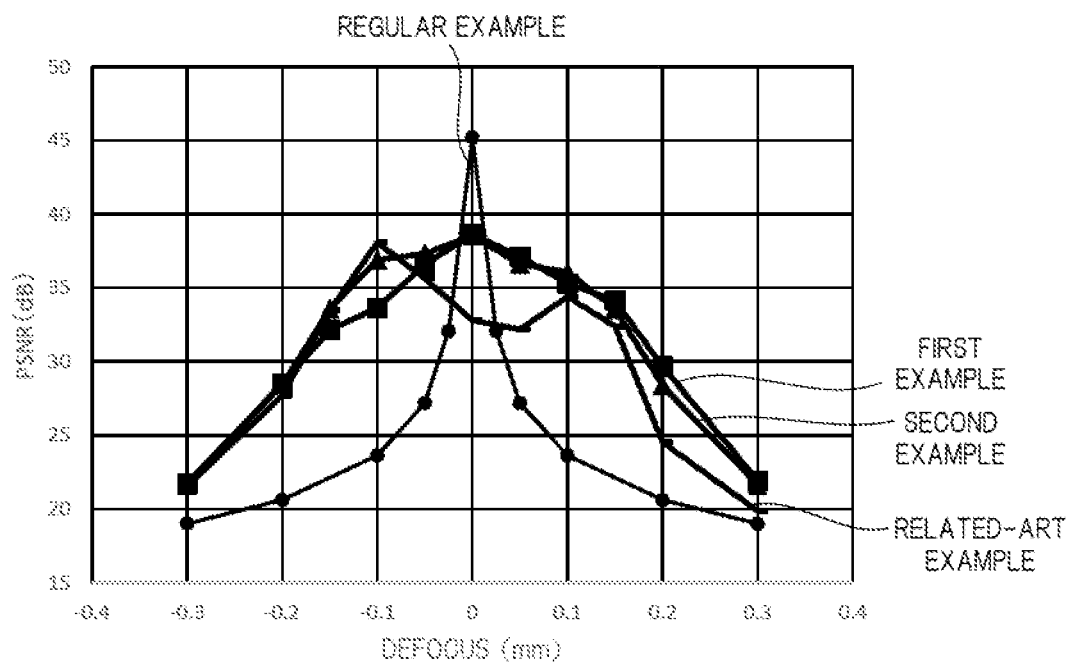
FIG. 9 is a diagram exemplifying an evaluation indicator value of a captured image done with an imaging process for defocus.

FIG. 9 is a diagram exemplifying the evaluation indicator value of the captured image done with the imaging process for the defocus. FIG. 9 shows the first example, the later-described second example, the related-art example and a regular value to overlap one another. In FIG. 9, a horizontal axis represents the defocus from the sensor plane of the imaging sensor 131, and a vertical axis represents the PSNR serving as the evaluation indicator value.

The PSNR on the vertical axis is expressed in a unit of dB (decibel), and shows that the larger the evaluation indicator value is, the smaller a difference between an original test image and the captured image done with the imaging process is.

FIG. 9 shows a simulation result of the evaluation indicator value of a quality of a captured image (reproduced image) done with a deconvolution process to the captured image. In this simulation, for example, a general test image that is called "Rena" is used as the imaging-target object to calculate a captured image produced when this test image is formed on the sensor plane of the imaging sensor 131 through the imaging optical system 110. Then, the deconvolution process (the blur removal process) is performed to the captured image to calculate its evaluation indicator value from the difference from the original test image.

As shown in FIG. 9, in the first example, the value of the PSNR in vicinity of the region where the defocus is zero is the highest. The larger the defocus is, the smaller the value of the PSNR is. In other words, in the vicinity of the focal point, the difference between the original test image and the captured image done with the imaging process is the smallest. The larger the defocus is, the larger the difference between the original test image and the captured image done with the imaging process is. However, in the first example, the value of the PSNR of the reproduced image done with the deconvolution imaging process in the region where the defocus is zero is equal to or larger than 35 dB. And, the values of the PSNR in the positive region and the negative region of the defocus are symmetric to each other across the region where the defocus is zero. In other words, from FIG. 9, it is found that the degree of the deterioration of the image quality is the same between the positive region and the negative region of the defocus.

On the other hand, in the related-art example, when the defocus is zero, the value of the PSNR is smaller than 35 dB and is smaller than the value of the first example. And, in the related-art example, the values of the PSNR in the positive region and the negative region of the defocus are not symmetric to each other. Accordingly, the configuration of the first example can improve the image quality of the captured image done with the imaging process in the region where the defocus is zero. Also, the configuration of the first example can improve the symmetric property of the values of the PSNR in the positive region and the negative region of the defocus, and can almost equalize the deterioration of the image quality in these regions.

Note that the "general" example shows quality deterioration of an image not done with the imaging process. As shown in FIG. 9, in the general case, the value of the PSNR is rapidly decreased by the defocus.

Figure 10:
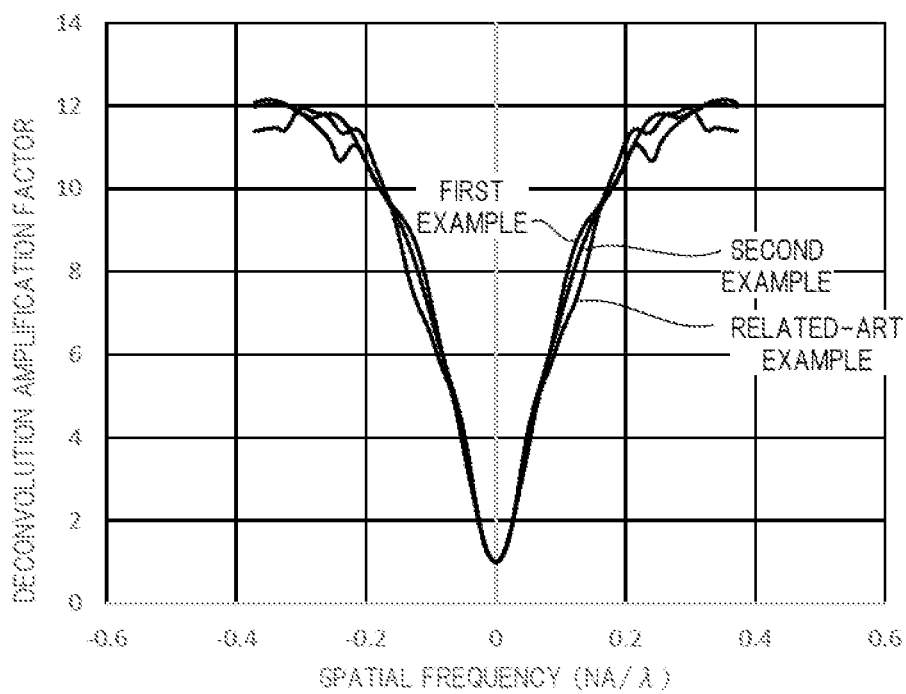
FIG. 10 is a diagram exemplifying a frequency property of a deconvolution filter providing a PSNR of FIG. 9.

FIG. 10 is a diagram exemplifying a frequency property of a deconvolution filter providing the PSNR of FIG. 9. In FIG. 10, a horizontal axis represents a spatial frequency, and a vertical axis represents an amplification factor. In other words, FIG. 10 shows an amplification gain in the deconvolution process for removing the blur from the captured image. FIG. 10 shows the first example, the later-described second example and the related-art example to overlap one another.

The focal-depth extension optical system SYS produces the captured image blurred by the optical system in order to reduce dependency of the image quality on the defocus, and restores the original image by removing the blur through the imaging process. Therefore, the frequency property of the deconvolution filter is exemplified as a high pass filter that restores a high frequency component having been decreased by the imaging optical system, through the imaging process.

In this case, such a high-pass process as exceeding an S/N ratio of the original captured image cannot restore the reproduced image (the image done with the imaging process) since the reproduced image is buried under noises. Therefore, the amplification gain is better to be as small as possible. In FIG. 10, the frequency property is almost equal between the first example and the related-art example, and the decrease of the S/N ratio is not expected.

Second Example

Next, the second example will be explained. As similar to the first example, the second example will be explained with reference to FIGS. 7 to 10. Note that the conditions of the second example are the same as those of the first example except that the number of the annular grooves 116 is four.

First, FIG. 7 will be explained. In the second example, the longitudinal aberrations Δz of the respective annular grooves 116 are set to be +0.3 mm, −0.3 mm, +0.3 mm and −0.3 mm in an order outward from the inner annular groove. Also in the second example, the function of the wavefront aberration is set for each annular groove 116. As shown in FIG. 7, it is found that the phase distribution is smoothly connected at the boundary between the adjacent annular grooves 116. Therefore, the second example also has the merit that does not generate the scattered light noises or others as similar to the first example.

Next, FIG. 8 will be explained. As shown in FIG. 8, also in the second example, the set value of the longitudinal aberration Δz is reflected to provide a property in which the value of the longitudinal aberration alternates between ±0.3 mm in each annular groove 116. As similar to the first example, the radius position of the zero cross point at which the longitudinal aberration is zero is also the radius position equally splitting the inner region and the outer region of the annular groove 116 to have the same area. Therefore, at the zero cross point, the light quantity of the region where the longitudinal aberration is on the positive side and the light quantity of the region where the longitudinal aberration is on the negative side are equal to each other. This manner improves the symmetric property of the image quality change based on the defocus in the positive region and the negative region of the longitudinal aberration Δz across the zero cross point.

Next, FIG. 9 will be explained. As shown in FIG. 9, also in the second example, in the region where the defocus is zero, the value of the PSNR of the reproduced image done with the deconvolution imaging process is larger than 35 dB. And, the symmetric property of the values of the PSNR in the positive region and the negative region of the defocus is more improved than, of course the related-art, and besides, the first example.

Next, FIG. 10 will be explained. A frequency property of the second example is almost equal to those of the related-art example and the first example. Therefore, also in the second example, the decrease of the S/N ratio is not expected.

[Others]

In addition, the present inventors have studied a configuration or others making the inner region area of the annular grooves and the outer region area of the annular grooves to be equal to each other regardless of which annular groove is taken, by decreasing the width of the annular groove to be narrower when getting closer to the outer circumferential side. The performance of the PSNR is more excellent in the case in which the widths of the annular grooves on the inner circumferential side and the outer circumferential side are equal to each other.

Note that the present invention is not limited to the above-described embodiments, and includes various modification examples. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment. Note that each member and a relative size shown in the drawings are simplified and idealized for easily understanding the present invention, and have complicated shapes in practice in some cases.

What is claimed is:

1. An imaging optical system comprising:
   an optical component having a plurality of annular grooves formed to provide a predetermined phase to optical ray propagating an effective pupil,
   wherein the plurality of annular grooves are sequentially formed in an order from an inner circumferential side to an outer circumferential side,
   in each of the annular grooves, a value of longitudinal aberration of the optical ray between an inner circumferential end of the annular grooves and an outer circumferential end of the annular grooves continuously changes from a first value to a second value, a sign of which is inverted from a sign of the first value, the value of the longitudinal aberration between the plurality of annular grooves alternates between the first value and the second value plural times to zigzag, the longitudinal aberration continues at a boundary between the annular grooves that are adjacent to each other, in each of the annular grooves, an area of an inner circumferential plane of the optical component and an area of an outer circumferential plane of the optical component are almost equal to each other at a zero cross point at which the longitudinal aberration is zero.

2. The imaging optical system according to claim 1,
wherein a change range of the longitudinal aberration in each of the annular grooves is the same among the plurality of annular grooves.

3. The imaging optical system according to claim 1,
wherein the optical component has a convex-concave shape made of a plurality of convex portions and concave portions that are axisymmetrically smoothly connected in a radius direction, the convex portions and the concave portions correspond to the annular grooves, a second-order differential value of a sag amount is almost discontinuous at a boundary between the concave portion and the convex portion, in the concave portion, an area of an inner circumferential plane of the optical component and an area of an outer circumferential plane of the optical component are almost equal to each other at a point at which a plane of the concave portion has an extremum, and in the convex portion, an area of an inner circumferential plane of the optical component and an area of an outer circumferential plane of the optical component are almost equal to each other at a point at which a plane of the convex portion has an extremum.

4. The imaging optical system according to claim 3,
wherein widths of the plurality of annular groves are almost equal to one another.

5. The imaging optical system according to claim 3,
wherein a sag shape of the concave portion along a radius direction of the optical component is expressed by a quartic or high-order function.

6. An imaging apparatus comprising:
the imaging optical system according to claim 1; and
an imaging sensor,
wherein a captured image is produced based on optical ray penetrating the imaging optical system forming an image on the imaging sensor.

7. A focal-depth extension optical system comprising:
the imaging apparatus according to claim 6; and
an imaging processor,
wherein the imaging processor performs an imaging process for removal of blur to the captured image.

* * * * *